US006960238B2

(12) United States Patent
Kepplinger et al.

(10) Patent No.: US 6,960,238 B2
(45) Date of Patent: Nov. 1, 2005

(54) METHOD AND INSTALLATION FOR THE INDIRECT REDUCTION OF PARTICULATE OXIDE-CONTAINING ORES

(75) Inventors: Leopold Werner Kepplinger, Leonding (AT); Franz Hauzenberger, Linz (AT); Johannes Schenk, Linz (AT); Sanghoon Joo, Pohang (KR)

(73) Assignee: Voest-Alpine Industrieanlagenbau GmbH & Co. (AT)

( * ) Notice: Subject to any disclaimer, the term of this patent is extended or adjusted under 35 U.S.C. 154(b) by 204 days.

(21) Appl. No.: 10/312,811

(22) PCT Filed: Jun. 27, 2001

(86) PCT No.: PCT/AT01/00209

§ 371 (c)(1),
(2), (4) Date: Mar. 4, 2003

(87) PCT Pub. No.: WO02/00945

PCT Pub. Date: Jan. 3, 2002

(65) Prior Publication Data

US 2003/0159541 A1 Aug. 28, 2003

(30) Foreign Application Priority Data

Jun. 28, 2000 (AT) .................................. A 1110/2000

(51) Int. Cl.[7] .............................................. C21B 13/14
(52) U.S. Cl. .............................. 75/380; 75/384; 266/81; 266/87
(58) Field of Search ..................... 75/380, 384, 444, 75/445, 446, 447, 448, 450, 451; 266/81, 87, 172

(56) References Cited

U.S. PATENT DOCUMENTS 3,985,547 A   10/1976  Iacotti et al. ................. 75/35
5,545,251 A    8/1996  Knop ......................... 75/444
5,584,910 A   12/1996  Kepplinger et al. .......... 75/445
6,336,954 B1 * 1/2002  Zeller et al. ................. 75/380

FOREIGN PATENT DOCUMENTS

| AT | 402937   | 9/1997 |
| DE | 10030550 | 8/2001 |
| JP | 58-34114 | 2/1983 |
| JP | 58-34115 | 2/1983 |
| JP | 58-34116 | 2/1983 |
| JP | 58-34117 | 2/1983 |
| WO | 81/02057 | 7/1981 |
| WO | 97/13878 | 4/1997 |
| WO | 97/13880 | 4/1997 |

OTHER PUBLICATIONS

International Search Report, Dec. 27, 2002.

* cited by examiner

Primary Examiner—Melvyn Andrews
(74) Attorney, Agent, or Firm—Ostrolenk, Faber, Gerb & Soffen, LLP

(57) ABSTRACT

In a process for the gas reduction of particulate oxide-containing ores, in particular iron-oxide-containing material, in the fluidized-bed process at a pressure of <5 bars, wherein the ore by aid of a reducing gas produced from coal is heated, optionally also pre-reduced, in a fluidized-bed reactor (1) designed as a pre-heating stage (5), subsequently is reduced to sponge iron in at least one fluidized-bed reactor (2, 3) designed as a reduction stage (7, 8), the reducing gas via a reducing-gas feed duct (12) or reducing-gas duct (13) being conducted from the reduction stage (7, 8) to the pre-heating stage (5) in the opposite direction of the material to be reduced and conducted from stage to stage, and being drawn off as an export gas after purification, heat is supplied to the reducing gas fed to the reduction stage (7, 8) and/or pre-heating stage (5), namely by combustion, together with oxygen and/or air, of a portion of the reducing gas provided for the gas reduction in the reduction stage (7, 8) and/or the pre-heating stage (5).

19 Claims, 7 Drawing Sheets

Figure 1:
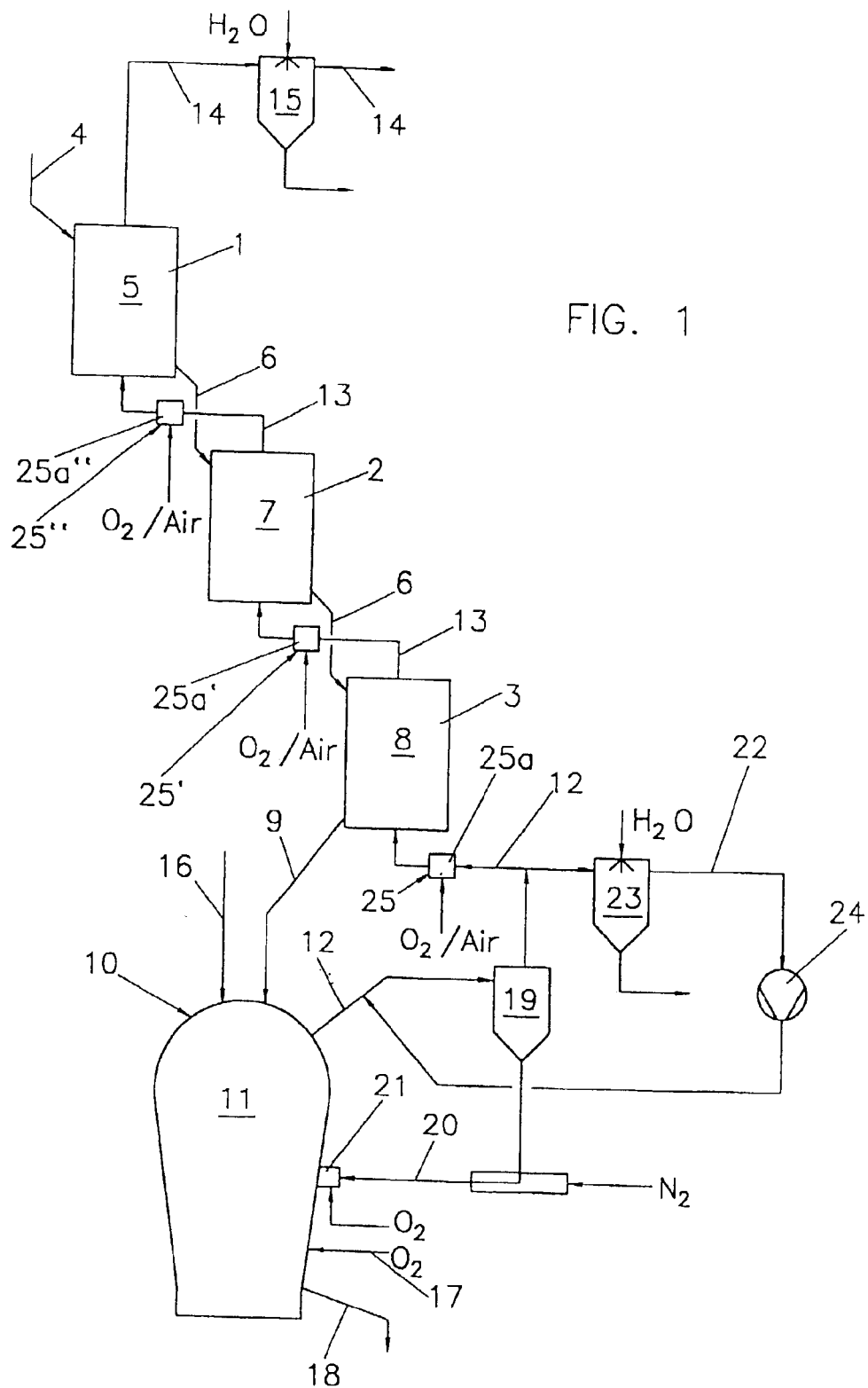

METHOD AND INSTALLATION FOR THE INDIRECT REDUCTION OF PARTICULATE OXIDE-CONTAINING ORES

The invention relates to a process for the gas reduction of particulate oxide-containing ores, in particular iron-oxide-containing material, in the fluidized-bed process at a pressure of $\leq 5$ bars, wherein the ore by aid of a reducing gas produced from coal is heated, optionally also pre-reduced, in a fluidized-bed reactor designed as a pre-heating stage, subsequently is reduced to sponge iron in at least one fluidized-bed reactor designed as a reduction stage, the reducing gas via a reducing-gas feed duct or reducing-gas duct being conducted from the reduction stage to the pre-heating stage in the opposite direction of the material to be reduced and conducted from stage to stage, and being drawn off as an export gas after purification, as well as to a plant for carrying out the process.

In case the reduction of the particulate oxide-containing ore takes place in several fluidized-bed reactors subsequently connected, the reducing gas being conducted from one reactor to the other in counterflow to the ore, the solid gets heated up stepwise while the enthalpy of the reducing gas decreases at the same time, partly due also to the reactions taking their course in the reduction. This may possibly lead, in the individual reduction stages for the solid, to temperatures that are so low that the reaction between reducing gas and oxide-containing ore is impeded kinetically and thermodynamically, i.e., the reduction of the ore is not done up to the desired degree during its temporal residence in the reduction reactor.

In a process of the initially mentioned kind, known from AT 402 937 B, iron-oxide-containing material is reduced in four fluidized-bed reduction zones subsequently connected in series. In order to set a constant, more or less equally high temperature in all of the fluidized-bed reduction zones, freshly formed reducing gas is, in addition to the reducing gas flowing through the fluidized-bed reduction zones arranged in series, in part fed directly to the fluidized-bed reduction zones following the fluidized-bed reduction zone arranged first in the direction of flow of the reducing gas, so that the fluidized-bed reduction zones are connected both in series and in parallel with regard to the reducing-gas conduct. Here, the additionally fed, freshly formed reducing gas is preferably fed to the individual fluidized-bed reduction zones in an amount of 5 to 15%.

However, a disadvantage connected therewith is that the pre-reduction stages have to be configured for gas amounts getting bigger and bigger towards the pre-heating stage as in each stage following the final reduction stage additional fresh reducing gas is added to the reducing gas leaving the preceding stage. Supposing further that in the final reduction zone a specific amount of reducing gas is in any case required for the complete reduction of the material used, irrespective of whether there is an additional parallel guidance of the reducing gas or not, an arrangement according to AT 402 937 B results, all in all, in a higher consumption of reducing gas.

In WO 97/13880 A and WO 97/13878 A there is described a process in which a portion of a reducing gas flowing from a final reduction stage into a pre-reduction stage is branched off, scrubbed, purified from $CO_2$ and heated and subsequently is recycled into the final reduction stage. In the pre-heating stage, oxygen is burnt with a portion of the reducing gas introduced into this stage, for the purpose of increasing its temperature.

According to WO 97/13880 A and WO 97/13878 A, only the temperatures in the fluidized-bed reactors corresponding to the final reduction stage and the pre-heating stage are controlled by way of a gas recycling and/or partial combustion. The reactors located between these two stages are, however, dependent on the conditions in the final-reduction fluidized-bed reactor.

From JP 58-34114 A there is known a process for the reduction of fine-grained iron ore, in which the reducing gas for the final reduction stage is produced by decomposition and reformation of hydrocarbon by means of the oxidizing off-gas drawn off the final reduction zone, the iron ore being pre-reduced in a first stage by carbon separated from the hydrocarbon. For providing the energy needed for the production of the reducing gas, the oxidizing off-gas is heated before being brought into contact with the hydrocarbon.

In U.S. Pat. No. 3,985,547 A there is described a process for the reduction of iron ore in a multiple fluidized-bed reactor, in which fresh reducing gas is produced by substoichiometric combustion of methane and oxygen in a burner associated with the reactor, which is arranged with its outlet opening between the lowermost fluidized bed and the fluidized bed located thereabove. The spent reducing gas leaving the uppermost fluidized bed is purified, liberated from water and $CO_2$ and, in the heated state, fed to the lowermost fluidized bed as a recycling reducing gas.

The invention has as its object to provide, in a process of the initially described kind, a possibility of independent temperature increase in the individual reduction stages without having to substantially increase the amount of reducing gas or needing an enlarged dimensioning of plant elements. The aim is to set the temperature in each individual fluidized-bed reduction stage and to set an optimum solid/gas-temperature profile as well as gas-quality profile above the fluidized-bed stages.

According to the invention, this object is achieved in that heat is supplied to the reducing gas fed to the reduction stage and/or pre-heating stage, namely by combustion, together with oxygen and/or air, of a portion of the reducing gas provided for the gas reduction in the reduction stage and/or the pre-heating stage. The partial combustion of the reducing gas represents the most efficient enthalpy addition and further offers the advantage that no substantial increase in the gas amount is necessary.

Furthermore, this object is achieved in that heat is supplied to the reducing gas by combustion of a portion of the export gas together with oxygen and/or air.

A further possibility of achieving the inventive object consists in burning, together with oxygen and/or air, a portion of the cooling gas used for cooling the reducing gas to be introduced into the final reduction zone, whereby heat is supplied to the reducing gas fed to the reduction stage and/or pre-heating stage.

Oxygen addition to the reducing gas allows for an individual energy distribution to the individual reactors, so that in for example three fluidized-bed reactors the inlet temperature of the reducing gas-when adding oxygen/air to all three reactors-could be as follows: 920° C.($1^{st}$ reactor)/890° C.($2^{nd}$ reactor)/900° C.($3^{rd}$ reactor). In case an oxygen/air addition was done only before the fluidized-bed reactor corresponding to the pre-heating stage ($3^{rd}$ reactor) and the final reduction stage ($1^{st}$ reactor), the inlet temperatures would have to change to 920° C./750° C./1140° C. in order to obtain the same reduction result, which would lead to an increased thermal load on reactor 3 and the ore charged into reactor 3. This problem is avoided by a process according to the invention.

By an increase in the reducing-gas temperature according to the invention, autoreforming reactions in the gas phase are preferred thermodynamically and kinetically, the dust present in the reducing gas optionally acting as a catalyst. In these autoreforming reactions, methane is reacted with carbon dioxide and/or water vapor to become carbon monoxide and/or hydrogen. This in situ generation of reducing constituents brings about an improvement of the reducing-gas analysis and thus also a thermodynamic improvement of the ore reduction.

Preferably, the portion to be burnt of the reducing gas, export gas or cooling gas is subjected to a scrubbing operation before being burnt, whereby locally very high temperatures originating from a combustion of dust-loaded gases and susceptible of resulting in a fusing of the dust due to a Boudouard reaction are avoided.

The oxygen and/or air necessary to the combustion of the reducing gas are fed into the reducing-gas feed duct or reducing-gas duct, which transports the reducing gas into the first fluidized-bed reduction zone and/or from one fluidized-bed reduction zone into the reduction zone arranged subsequently, advantageously via lances which at the same time act as burners. Thanks to this arrangement, the requirements as to equipment are kept very limited.

Another possibility of setting the temperature in the reduction fluidized-bed stages consists in supplying heat to the reducing gas by burning external combustible gas and/or solid and/or liquid fuels together with oxygen and/or air.

According to a preferred embodiment, the combustion of the combustible gases or solid and/or liquid fuels is done in a burner provided in the reducing-gas feed duct or reducing-gas duct. Suitably, the duct may have an enlarged site in this area.

According to another preferred embodiment, the combustion of combustible gas or solid and/or liquid fuel is done in a combustion chamber separated from the reducing-gas feed duct or reducing-gas duct, the combustion gases and possibly not burnt solids subsequently being introduced into the reducing-gas feed duct or reducing-gas duct. Thereby, hot flame fronts that possibly appear are leveled before they get into contact with dust-loaded reducing gas and likewise cause a fusing of the dust in the ducts.

Advantageously, combustible gas or solid and/or liquid fuel is burnt together with oxygen and/or air by means of at least one burner which is provided in the reduction fluidized-bed reactor. Here, the combustion gases are introduced directly into the fluidized-bed reactor.

According to another preferred embodiment, only oxygen and/or air are fed into the fluidized-bed reactor via a burner, preferably a lance, and the reducing gas is directly burnt there.

Here, the burner suitably may be arranged either below the fluidized bed formed in the fluidized-bed reactor, on the level of the fluidized bed or above the same, whereby the heat can be supplied to the reducing gas extremely selectively and particularly efficiently.

The two latter alternatives are particularly advantageous because here, the thermal load on the distributor bottom is smaller and fouling of solid on and/or in nozzles or openings of the distributor bottom is prevented or at least reduced.

According to a preferred embodiment of the process according to the invention, reducing gas and/or export gas and/or cooling gas and/or external combustible gas and/or solid and/or liquid and/or gaseous fuel on a hydrocarbon basis are additionally used for the combustion. This embodiment proves to be particularly advantageous when any fuel from the above-indicated group is present in excess or reducing gas, export gas and/or cooling gas are needed mainly for other purposes and therefore are not available in a sufficient quantity.

Preferably, a material increasing the proportion of reductants in the reducing gas by at least partially reacting with the reducing gas, in particular natural gas and/or coal, is admixed to the reducing gas fed to the reduction stage and/or pre-heating stage. Hereby, the phenomenon of sticking, which impedes the reduction process, is avoided. The reason for it are directional, needle-like iron precipitations on the surfaces of the fine ore particles, which originate at higher temperatures and a low reduction potential. The reaction of the materials may also be done in a burner.

Feeding additional fuels allows to positively influence the temperature setting, the oxidation degree of the reducing gas and optionally an increase in the total gas amount.

Furthermore, the invention provides for a process in which a material increasing the proportion of reductants in the reducing gas by at least partially reacting with the reducing gas, in particular natural gas and/or coal, is admixed to the reducing gas fed to the reduction stage and/or pre-heating stage, wherein no combustion takes place.

The advantages of this process are that sticking is avoided, as mentioned above.

Figure 5:
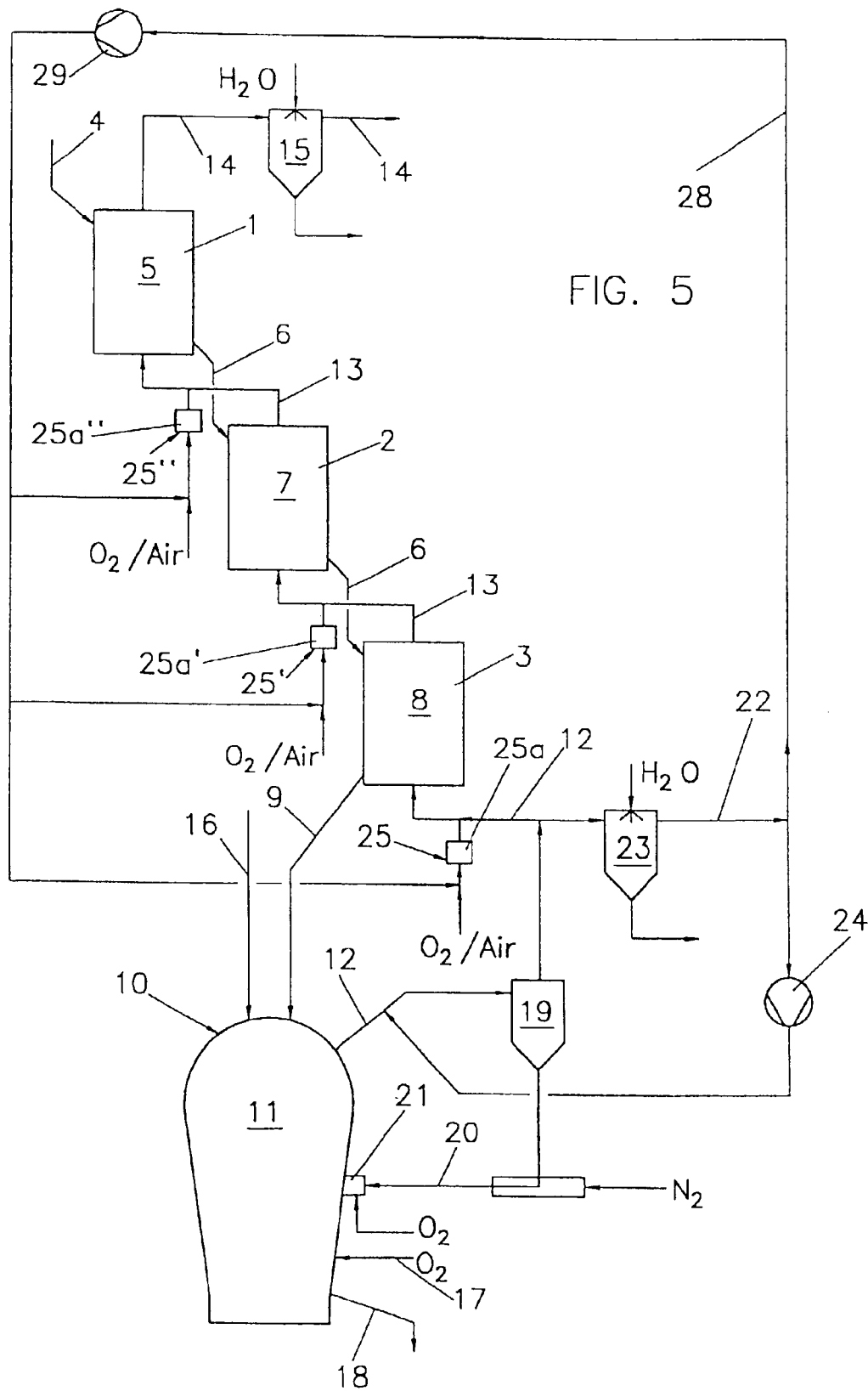
Figure 6:
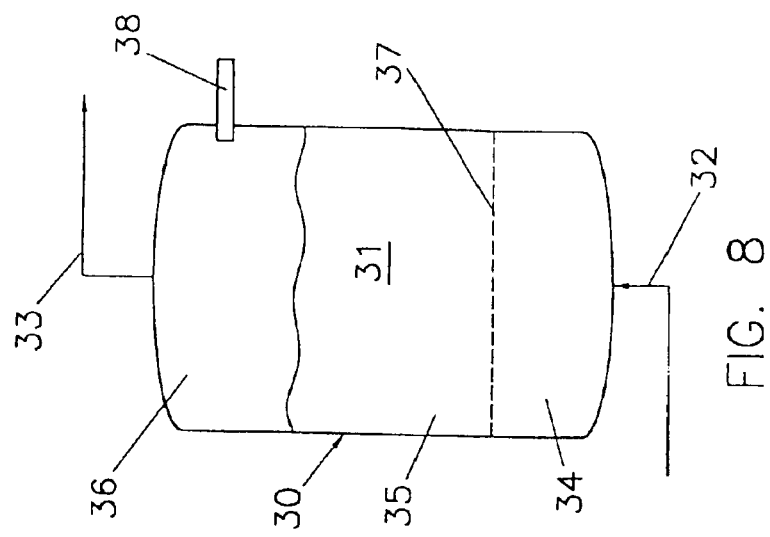
Figure 7:
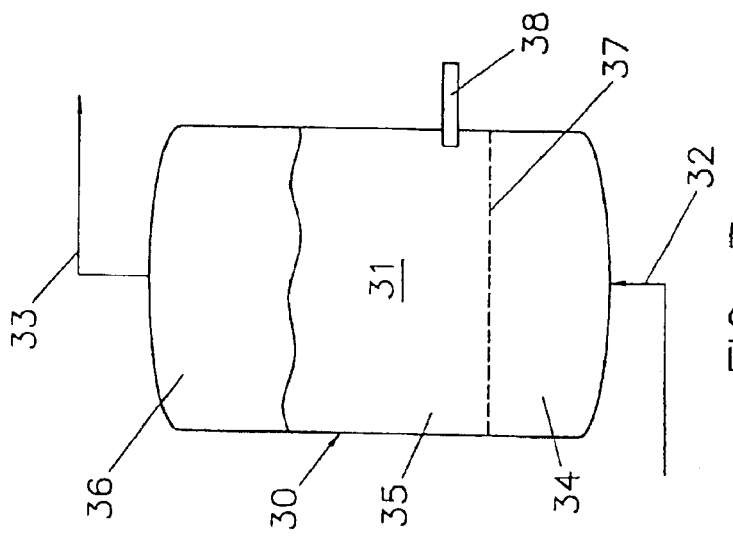
Figure 8:
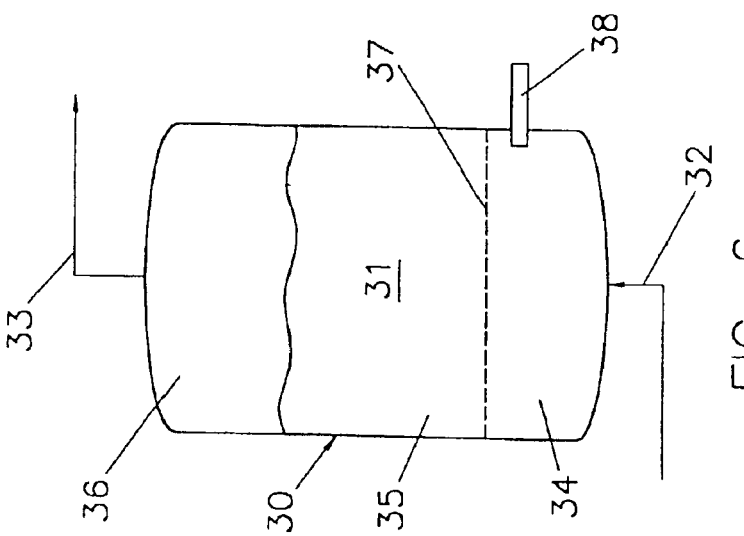

In the following, the invention will be explained in more detail with reference to the drawings, wherein FIGS. 1 to 3 and 9 each show an embodiment of an inventive process in a block diagram, FIGS. 4 and 5 each show a preferred embodiment of the processes represented in FIGS. 2 and 3, respectively, in a block diagram and FIGS. 6 to 8 show an enlarged detail of a preferred embodiment in diagrammatic representation.

FIG. 1 shows three fluidized-bed reactors, 1 to 3, subsequently connected in series, wherein iron-oxide-containing material, such as fine ore, via an ore feed duct 4 is fed to the first fluidized-bed reactor, 1, in which in a pre-heating stage 5 pre-heating of the fine ore and, optionally, pre-reduction take place, and subsequently via conveying ducts 6 is conducted from fluidized-bed reactor 1 to fluidized-bed reactors 2, 3. In fluidized-bed reactor 2, pre-reduction is done in a pre-reduction stage 7, and in fluidized-bed reactor 3, final reduction of the fine ore to sponge iron is performed in a final reduction stage 8.

The completely reduced material, i.e. the sponge iron, is conducted into a melt-down gasifier 10 via a conveying duct 9. In melt-down gasifier 10, in a melt-down gasifying zone 11, there is produced from coal and oxygen-containing gas a CO and $H_2$-containing reducing gas which via reducing-gas feed duct 12 is introduced into fluidized-bed reactor 3, arranged last in the direction of flow of the fine ore. The fluidized-bed process is carried out at a pressure of $\leq 5$ bars. In counterflow to the ore flow, the reducing gas is conducted from fluidized-bed reactor 3 to fluidized-bed reactors 2 to 1 via reducing-gas ducts 13, via an export-gas discharge duct 14 is discharged from fluidized-bed reactor 1 as an export gas and subsequently is cooled and scrubbed in a wet scrubber 15.

Melt-down gasifier 10 has a supply means 16 for solid carbon carriers, a supply means 17 for oxygen-containing gases and optionally supply means for carbon carriers that are liquid or gaseous at room temperature, such as hydrocarbons, as well as for burnt fluxes. In melt-down gasifier 10, molten pig iron and/or molten steel pre-material and molten slag, which are tapped via a tap 18, collect below melt-down gasifying zone 11.

In reducing-gas feed duct 12, which departs from melt-down gasifier 10 and opens into fluidized-bed reactor 3, a dedusting means 19, such as a hot gas cyclone, is provided, the dust particles separated in this cyclone being fed to melt-down gasifier 10 via recycle duct 20 with nitrogen as conveying medium and via a burner 21 under blowing-in of oxygen.

From reducing-gas feed duct 12 there departs a gas recycle duct 22 which via a scrubber 23 and a compressor 24 recycles a portion of the reducing gas into reducing-gas feed duct 12 again, namely before the arrangement of hot gas cyclone 19, whereby setting of the reducing-gas temperature is enabled.

In reducing-gas duct 13 or reducing-gas feed duct 12, burners 25, 25' and 25" are each provided before fluidized-bed reactors 1 to 3 in the direction of the gas flow, to which burners there are fed oxygen and/or air, for the partial combustion of the reducing gas, the burners being formed by a feed site for combustible gas and oxygen and/or air as well as by a combustion chamber 25a, 25'a and 25"a. These burners 25, 25' and 25" may also be designed as lances feeding oxygen and/or air, a portion of the reducing-gas duct acting as combustion chamber of burner 25. For the purpose of feeding oxygen, also an oxygen-containing gas may be used. By the amount of oxygen and/or air fed, the combustion and thus the temperature of the reducing gas may be controlled individually according to the requirements of the reduction stages and/or the pre-heating stage, whereby conditions thermodynamically favorable to the reduction are created and autoreforming reactions are facilitated and, further, the thermal load per fluidized-bed reactor is reduced.

Figure 2:
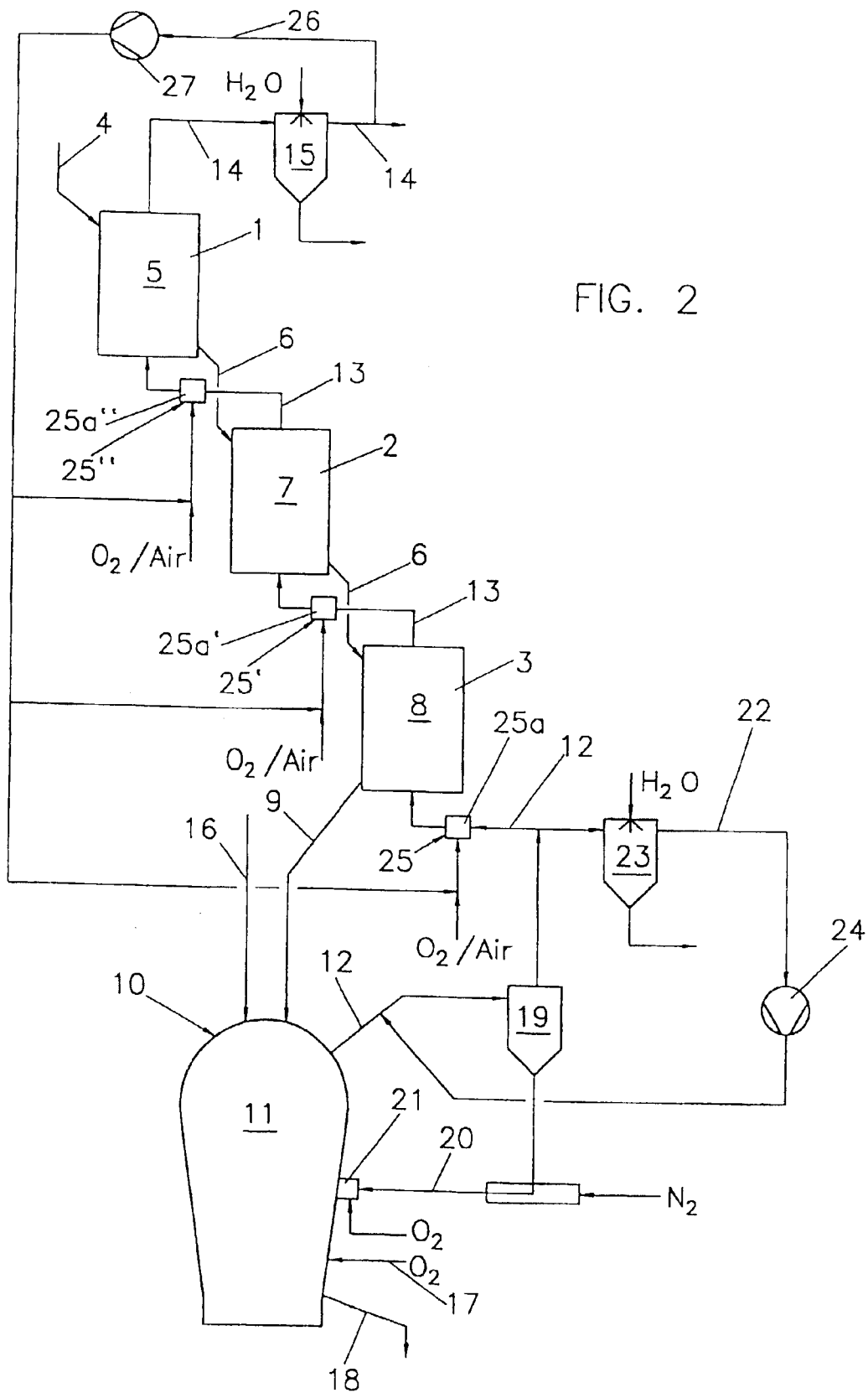

According to the process variant represented in FIG. 2, an export-gas duct 26 branches off export-gas discharge duct 14 after wet scrubber 15, which export-gas duct via a compressor 27 feeds, in a parallel manner, a portion of the purified export gas to burners 25, 25' and 25", provided in reducing-gas ducts 13 and reducing-gas feed duct 12, so that it is burnt there together with oxygen and/or air and thus provides the necessary heat to the reducing gas.

Figure 3:
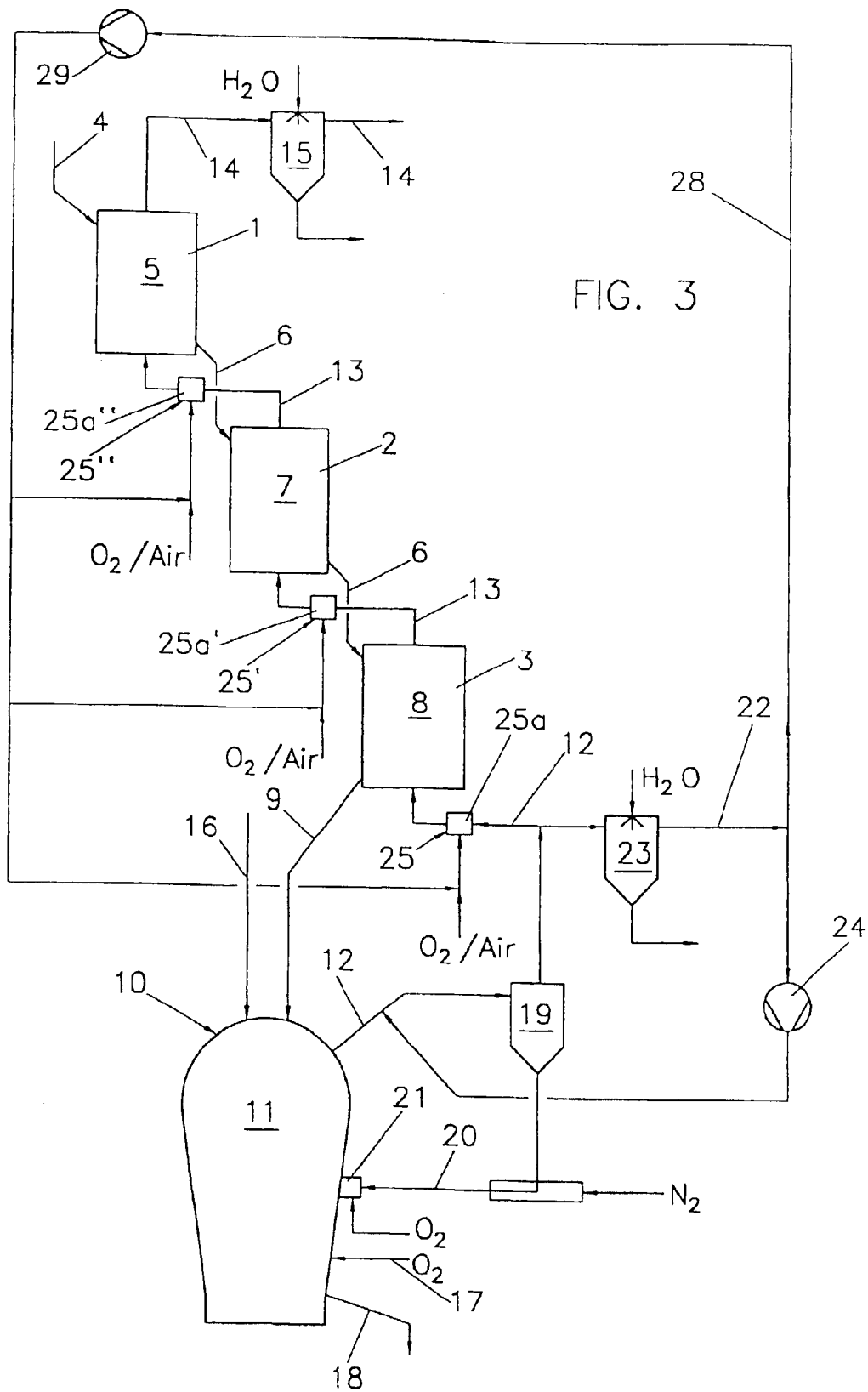

The inventive process represented in FIG. 3 differs from the process variant represented in FIG. 1 in that the supply of heat to the reducing gas is done by combustion of a portion of the cooling gas together with oxygen and/or air and not by combustion of reducing gas fed to the fluidized-bed reactors. For this purpose, a cooling-gas duct 28 branches off gas recycle duct 22 after scrubber 23, which cooling-gas duct via a compressor 29 transports in a parallel manner a portion of the cooling gas to burners 25, 25' and 25".

Figure 4:
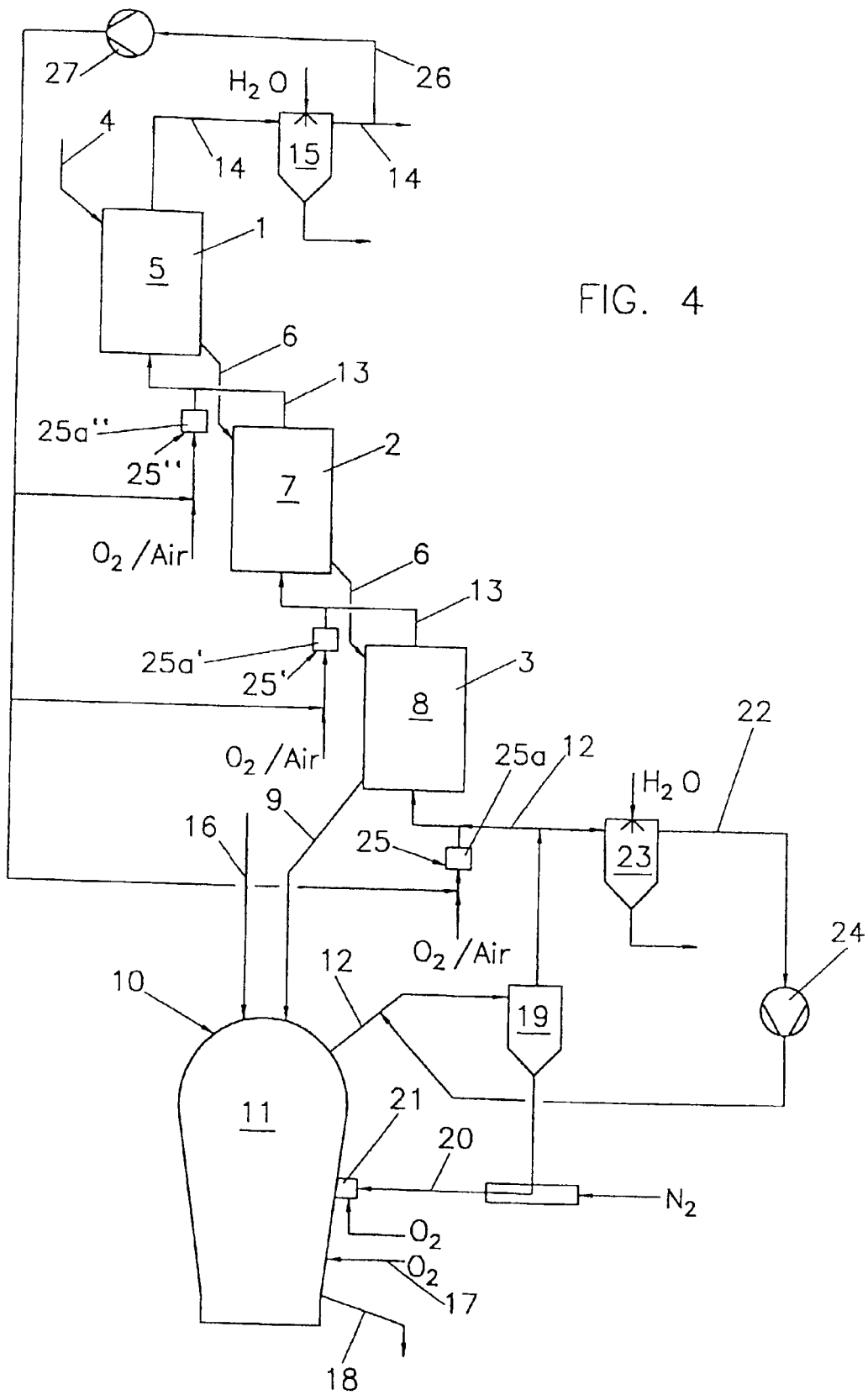

FIG. 4 shows a preferred embodiment of the process variant represented in FIG. 2. Here, export-gas duct 26 runs into burners 25, 25' and 25", constituted by combustion chambers 25a, 25'a and 25"a, which burners are, in contrast with the representation in FIG. 2, not integrated into reducing-gas ducts 13 or reducing-gas feed duct 12.

FIG. 5 illustrates that embodiment of the process represented in FIG. 3 that is analogous to FIG. 4. That portion of the cooling gas that is destined to be burnt is burnt together with oxygen and/or air in separate combustion chambers 25a, 25'a and 25"a, which constitute burners 25, 25' and 25", and subsequently is introduced into reducing-gas ducts 13 or reducing-gas feed duct 12.

According to a preferred embodiment of the invention, the combustion of the combustible gas (reducing gas, export gas or cooling gas) used is done together with oxygen and/or air by means of a burner associated with a fluidized-bed reactor.

Fluidized-bed reactor 30, which is represented diagrammatically in FIG. 6, exhibits an interior space 31, divided into three zones, a gas feed duct 32 leading to said interior space at the bottom and an off-gas duct 33 departing from said interior space at the top. Lowermost zone 34 is separated from middle zone 35 by distributor bottom 37, which evenly distributes over the entire cross-section of fluidized-bed reactor 30 the reducing gas flowing from bottom to top through interior space 31 of fluidized-bed reactor 30 and thereby produces a uniform fluidized bed of fine ore particles. The boundary between middle zone 35, formed by the fluidized bed, and uppermost zone 36, which is called freeboard, is less pronounced than in the case of the two lower zones. In the freeboard, the gas space is calmed down, whereby the discharging of ore particles from fluidized-bed reactor 30 is minimized. In lowermost zone 34 below distributor bottom 37, a burner 38 is arranged, to which there lead an oxygen and/or air duct that is not represented as well as a duct for reducing gas, export gas, cooling gas, external combustible gas and/or solid and/or liquid fuels. However, it is also possible that only one duct for oxygen and/or air is provided, with the combustion of the reducing gas taking place directly in the reactor. The hot combustion gases supply heat to the reducing gas flowing into fluidized-bed reactor 30 and/or lead to autoreforming reactions. Advantageously, materials increasing the proportion of reductants in the reducing gas, such as natural gas and/or coal, may also be admixed to the reducing gas via burner 38.

In the embodiment represented in FIG. 7, burner 38 is arranged in middle zone 35, in the fluidized bed. This embodiment is advantageous particularly when the reducing gas is very dust-loaded, given that then there is no risk that distributor bottom 37 is blocked by fusing dust.

FIG. 8 shows a preferred embodiment in which burner 38 is arranged above fluidized-bed 35, i.e. in freeboard 36. Here, the heat transfer is done by radiation and/or convection by particles discharged from the fluidized bed.

Figure 9:
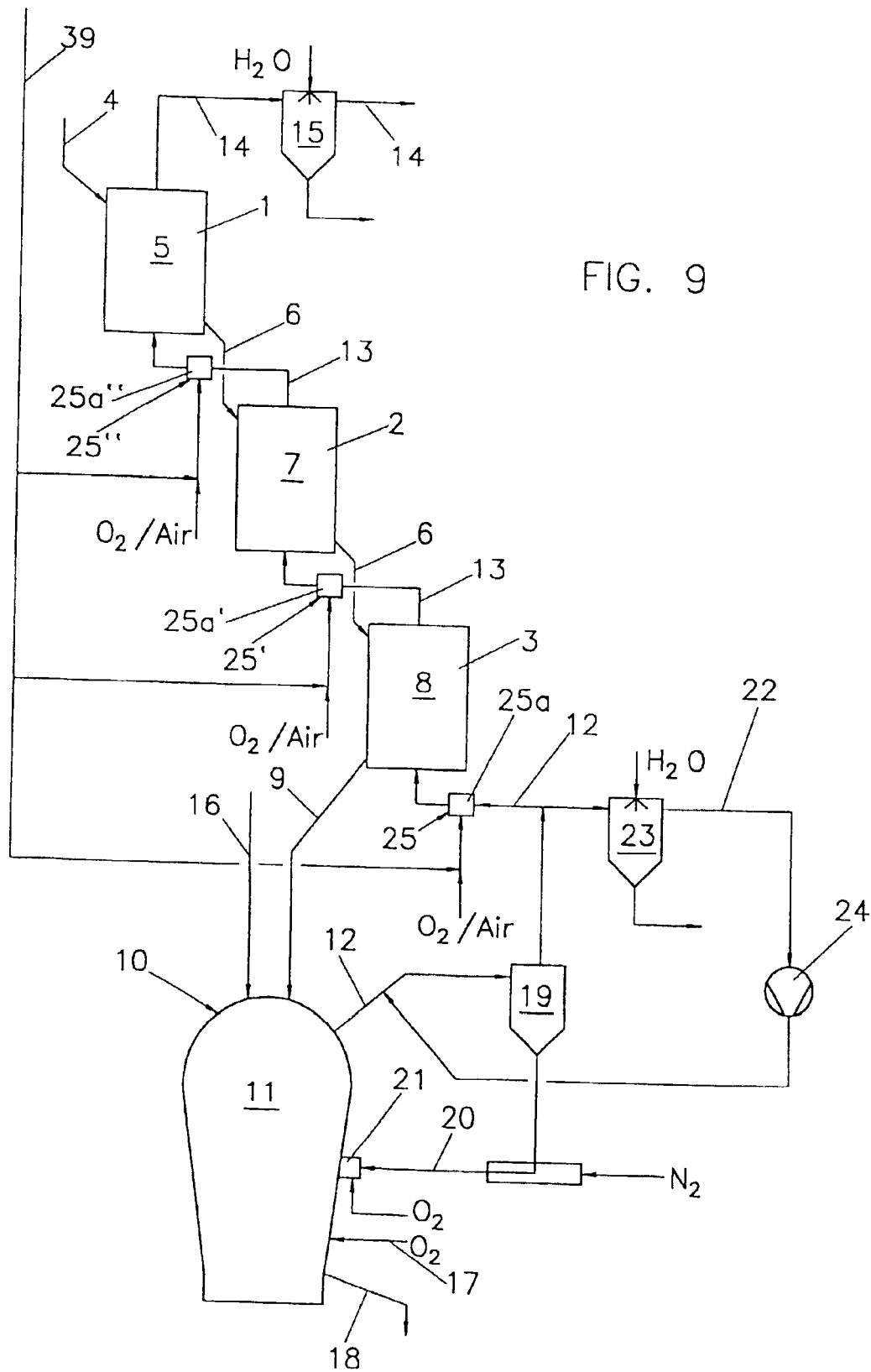

The process variant illustrated in FIG. 9 exhibits substantially all of the features of the plant represented in FIG. 2. In contrast with FIG. 2, however, no export gas is fed via duct 26 and compressor 27 to burners 25, 25' and 25", provided in reducing-gas ducts 13 and reducing-gas feed duct 12, but external combustible gas and/or solid and/or liquid fuel which is transported to burners 25, 25' and 25" via a duct 39.

The invention is not limited to the exemplary embodiments represented in the drawings but may be modified in various aspects. For example, it is possible to select the number of fluidized-bed reactors according to requirements. Also, the reducing gas can be produced in accordance with various known methods.

What is claimed is:

1. A fluidized-bed process for gas reduction of particulate iron oxide-containing ores, the process comprising the steps of:

preheating, and also optionally pre-reducing the ore in the presence of a reducing gas produced from coal in a first fluidized-bed reactor designed as a pre-heating stage;

then reducing the preheated ore to sponge iron in the presence of a reducing gas produced from coal in a reduction stage comprising at least one further fluidized-bed reactor;

conducting reducing gas for the reduction step to the reduction stage via a first feed duct;

conducting reducing gas for the preheating step from the reduction stage to the pre-heating stage via a second feed duct;

maintaining the fluidized beds at a pressure of $\leq 5$ bars, drawing off and purifying the reducing gas from the preheating stage as an export gas;

heating the reducing gas fed to the reduction stage and/or pre-heating stage by combustion together with oxygen and/or air, of a quantity of combustible material;

independently controlling the composition and/or temperature of the reducing gas provided to the fluidized-bed stages.

2. A process according to claim 1, wherein a portion of the gas fed to the reducing stage and/or the pre-heating stage is used as the combustible material.

3. A process according to claim 1, wherein a portion of the export gas is used as the combustible material.

4. A process according to claim 1, wherein a portion of a gas employed for cooling the final fluidized-bed of the reduction stage is used as the combustible material.

5. A process according to claim 1, further including the step of:

scrubbing a portion of the reducing-gas provided to the reduction stage and/or the pre-heating stage, or the export gas or gas used for cooling the final fluidized-bed of the reduction stage; and using the scrubbed gas as the combustible material.

6. A process according to claim 1, wherein an externally supplied gas and/or a solid fuel and/or a liquid fuel is used as the combustible material.

7. A process according to claim 1, wherein reducing gas and/or export gas and/or cooling gas is used as the combustible material, together with an externally-supplied combustible hydrocarbon-based fuel in gaseous and/or solid and/or liquid form.

8. A process according to claim 1, further including the step of admixing natural gas and/or coal with the reducing gas fed to the reduction stage and/or the pre-heating stage to increase the proportion of reductants in the reducing gas.

9. A process according to claim 1, wherein the combustion is done in a burner provided in a duct for providing the reducing-gas.

10. A process according to claim 1, wherein:

the reducing-gas is provided to the fluidized-beds by respective feed ducts; and combustion is done in a combustion chamber separated from the reducing-gas feed ducts, an outlet of the combustion chamber being connected to an inlet of at least one of the feed ducts.

11. A process according to claim 1 wherein the combustion is done by means of at least one burner associated with at least one fluidized-bed reactor, the combustion gases being introduced directly into the fluidized-bed reactor.

12. A process according to claim 1, wherein oxygen and/or air are fed into at least one of the reducing-gas feed ducts via lances.

13. A process according to claim 1, wherein oxygen and/or air are fed into at least one of the fluidized-bed reactors via a burner in the form of a lance.

14. A plant for carrying out the process according to claim 1, comprising:

at least two fluidized-bed reactors connected in series for the gas reduction of particulate oxide-containing ores by means of a CO and $H_2$-containing reducing gas produced from coal, a first feed duct coupled to feed reducing-gas to the last of the fluidized-bed reactors in the series;

a discharge duct departing from the first of the fluidized-bed reactors in the series for discharging spent reducing gas as export gas;

a gas recycle duct for cooling gas, branching off the reducing-gas feed duct and running back into the reducing-gas feed duct via a scrubber;

a second feed duct for conducting reducing gas from one fluidized-bed reactor into the preceding fluidized-bed reactor in the series;

at least one burner having a feed duct for receiving reducing gas and/or export gas and/or cooling gas and/or external combustible gas and/or solid and/or liquid fuel and/or oxygen and/or air for the combustion of a portion of the reducing gas, export gas or cooling gas, of external combustible gas or solid or liquid fuel together with oxygen and/or air; and a process controller for independently controlling the temperature and reducing gas composition in each of the fluidized bed reactors.

15. A plant according to claim 14, further including:

a scrubber in the export-gas discharge duct; and an export-gas feed duct coupled to feed scrubbed export gas to the burner.

16. A plant according to claim 14, wherein the burner is located in a combustion chamber, the combustion chamber having an outlet which is flow-connected to at least one of the reducing-gas feed ducts.

17. A plant according to claim 14, wherein the burner is arranged in one of the fluidized-bed reactors either below the fluidized bed, on the level of the fluidized bed, or above the fluidized bed.

18. A plant according to claim 14, wherein the burner and an associated combustion chamber is provided directly in one of the reducing-gas feed ducts.

19. A plant according to claim 14, wherein the burner is designed as an oxygen and/or air lance.

* * * * *

UNITED STATES PATENT AND TRADEMARK OFFICE
CERTIFICATE OF CORRECTION

PATENT NO.        : 6,960,238 B2
APPLICATION NO. : 10/312811
DATED             : November 1, 2005
INVENTOR(S)       : Leopold Werner Keppplinger et al.

It is certified that error appears in the above-identified patent and that said Letters Patent is hereby corrected as shown below:

On the Title Page, Item (73) Assignee should read

--Voest-Alpine Industrieanlagenbau GmbH & Co (AT)
Pohang Iron & Steel Co., Ltd. (KR)
Research Institute of Industrial Science & Technology, Incorporated Foundation (KR)--.

Signed and Sealed this

Nineteenth Day of December, 2006

JON W. DUDAS
*Director of the United States Patent and Trademark Office*